United States Patent
Lim et al.

(10) Patent No.: US 10,647,827 B2
(45) Date of Patent: May 12, 2020

(54) POLYMER COMPOSITE STRENGTHENED WITH CARBON FIBER SURFACE-MODIFIED BY PLASMA TREATMENT AND METHOD FOR PRODUCING POLYMER COMPOSITE

(71) Applicant: KOREA UNIVERSITY RESEARCH AND BUSINESS FOUNDATION, Seoul (KR)

(72) Inventors: Dae-Soon Lim, Seoul (KR); Eung-seok Lee, Seoul (KR); Choonghyun Lee, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 16/075,820

(22) PCT Filed: Feb. 3, 2017

(86) PCT No.: PCT/KR2017/001176
§ 371 (c)(1),
(2) Date: Aug. 6, 2018

(87) PCT Pub. No.: WO2017/135723
PCT Pub. Date: Aug. 10, 2017

(65) Prior Publication Data
US 2019/0040214 A1    Feb. 7, 2019

(30) Foreign Application Priority Data
Feb. 4, 2016    (KR) .................. 10-2016-0013851

(51) Int. Cl.
*C08J 5/06* (2006.01)
*C08K 7/06* (2006.01)
(Continued)

(52) U.S. Cl.
CPC ............... *C08J 5/06* (2013.01); *C08K 7/06* (2013.01); *C08K 9/04* (2013.01); *C08L 101/00* (2013.01);
(Continued)

(58) Field of Classification Search
CPC ... D01F 11/16; D01F 9/12; C08J 5/06; D06M 2101/40; D06M 10/025; D06M 10/02;
(Continued)

(56) References Cited

U.S. PATENT DOCUMENTS

2005/0008561 A1    1/2005  Fischer et al.
2011/0297892 A1*  12/2011  Shah .................. B82Y 30/00
                                             252/511

FOREIGN PATENT DOCUMENTS

JP    H 01-122911    *   5/1989
JP    5059589 B2    10/2012
(Continued)

OTHER PUBLICATIONS

RTP, Polyetherimide, accessed online Sep. 4, 2019.*
(Continued)

*Primary Examiner* — Camie S Thompson
(74) *Attorney, Agent, or Firm* — NSIP Law

(57) ABSTRACT

Provided are an engineering plastic composite and a method for producing the same. The engineering plastic composite includes a carbon fiber having a surface modified by a hydrogen plasma and including a functional group and an engineering plastic. The carbon fiber is mixed with the engineering plastic to constitute a composite.

5 Claims, 20 Drawing Sheets

(51) Int. Cl.
*C08L 101/00* (2006.01)
*D06M 11/01* (2006.01)
*D06M 10/06* (2006.01)
*C08K 9/04* (2006.01)
*D06M 10/02* (2006.01)
*D06M 101/40* (2006.01)

(52) U.S. Cl.
CPC .......... *D06M 10/025* (2013.01); *D06M 10/06* (2013.01); *D06M 11/01* (2013.01); *C08J 2300/00* (2013.01); *D06M 2101/40* (2013.01)

(58) Field of Classification Search
CPC ... D06M 10/06; D06M 2200/00; D06M 11/74
USPC ...... 423/447.1; 264/105, 347; 977/753, 847; 427/110, 111; 428/300.1, 297.4, 327
See application file for complete search history.

(56) References Cited

FOREIGN PATENT DOCUMENTS

| | | |
|---|---|---|
| JP | 2013-224435 A | 10/2013 |
| KR | 10-2012-0055042 A | 5/2012 |
| KR | 10-2013-0021283 A | 3/2013 |
| KR | 10-2014-0121019 A | 10/2014 |

OTHER PUBLICATIONS

Curbell Plastics, Peek, accessed online Sep. 4, 2019.*
Toray Industries, accessed online Sep. 4, 2019.*
Han, Chang Ji et al., "Improving carbon fiber adhesion to hydrogen plasma treatment", Proceeding of the 1$^{st}$ International Symposium on Emerging Functional Materials, 2015 Fall Meeting of The Korean Ceramic Society, Nov. 4, 2015, pp. 71 (2 pages in Korean, 1 page in English).
International Search Report dated Aug. 9, 2018 in corresponding International Application No. PCT/KR2017/001176 (3 pages in Korean).
International Search Report dated May 22, 2017 in corresponding International Application No. PCT/KR2017/001176 (3 pages in English, 3 pages in Korean).
Han, Chang Ji et al., "Improving carbon fiber adhesion to hydrogen plasma treatment", Proceeding of the 1$^{st}$International Symposium on Emerging Functional Materials, 2015 Fall Meeting of The Korean Ceramic Society, dated Nov. 4, 2015, pp. 71 (2 pages in Korea, 1 page in English).
Written Opinion of the International Searching Authority dated May 22, 2017 in corresponding International Application No. PCT/KR2017/001176 (14 pages in Korean).

* cited by examiner

POLYMER COMPOSITE STRENGTHENED WITH CARBON FIBER SURFACE-MODIFIED BY PLASMA TREATMENT AND METHOD FOR PRODUCING POLYMER COMPOSITE

CROSS REFERENCE TO RELATED APPLICATIONS

This application is a National Stage Application of International Application No. PCT/KR2017/001176 filed on Feb. 3, 2017, which claims priority to Korea Patent Application No. 10-2016-0013851 filed on Feb. 4, 2016, in the Korean Intellectual Property Office.

TECHNICAL FIELD

The present disclosure relates to carbon fiber reinforced polymer composites and, more particularly, to a carbon fiber reinforced polymer composite with a surface modified carbon fiber through plasma treatment.

BACKGROUND

Engineering plastics are superior in strength, elasticity, and thermal stability as well as chemical resistance and electrical insulation, as compared to general-purpose plastics. Accordingly, the engineering plastics have recently been applied to various industrial fields such as household goods, electrical and electronic products, and aircraft structural materials and various studies are being actively conducted on the engineering plastics as candidate materials that can replace metals.

Engineering plastics may be classified into general engineering plastics including five general-purpose engineering plastics with high usage and high-performance engineering plastics with excellent heat resistance. However, these high-performance engineering plastic materials have a higher production cost than other plastics in spite of their excellent performance. Thus, unlike general-purpose plastics which are easy in mass produce, the high-performance plastic materials are mainly focused on customized development and production required for end use.

As a result, actual applications of high-performance plastic materials have been quite limited up to now due to their relatively lower high-temperature mechanical properties than metal materials in automobile parts and turbine materials for metal replacement which may be most demanding.

Carbon fibers are low-cost reinforced materials which are light and strong, have a high modulus of elasticity, and are also widely used in general-purpose plastics including engineering plastics.

In general, commercially available plastics including engineering plastics are provided as carbon fiber/plastic composites with carbon fiber added. Strength improvement of several times to several tens of times may be achieved depending on the amount of the carbon fiber added. Carbon fibers may be used by mixing various types of carbon fibers such as PAN-based carbon fibers, Pitch-based carbon fibers, and Rayon-based carbon fibers according to the types of plastic such as thermosetting and thermoplastic.

Each carbon fiber is subjected to a sizing treatment to coat the carbon fiber with an interfacial binder to achieve a stable physical interface between plastic resins. When a composite material is prepared by mixing the sizing-treated carbon fiber with a plastic, the composite material exhibits very excellent reinforcing effect at room temperature but exhibits very low interfacial stability between a plastic base material and a surface of the carbon fiber at high temperature. For this reason, high-temperature reinforcing effect is negligible, which is not suitable as a reinforcing method for high heat-resistance engineering plastics.

To overcome these disadvantages, applying a solvent solution of a sizing agent containing a polyglycidyl ether to a carbon fiber as a method for modifying a carbon fiber surface is disclosed (Patent Document 1). However, the method is not preferable due to probability of environmental contamination caused by addition of acid or chemical.

In addition, a method for modifying a surface of a carbon fiber using atmospheric pressure plasma during the production of the carbon fiber is disclosed (Patent Document 2). However, the method is limited in using excellent characteristics of a pure carbon fiber because a nano-thin film is formed on a surface of the carbon fiber.

A technology proposed in the present disclosure to overcome the above-described disadvantages reduces the manufacturing cost through an environment-friendly and simple process by plasma-treating a commercially available carbon fiber and induces mechanical and chemical bonding between a plastic and a carbon fiber by modifying a surface of the carbon fiber and providing a functional group to improve mechanical characteristics. Accordingly, the technology is aimed at securing stable mechanical properties even at high temperature to widen its use range.

Patent Document 1: Japanese Patent Publication No. 50-59589

Patent Document 2: Korean Patent Publication No. 10-2012-0055042

SUMMARY

The present disclosure relates to a carbon fiber reinforced engineering plastic composite and a method for producing the same which adjusts a chemical function group on a carbon fiber surface through a plasma treatment of a conventional carbon fiber and thus promote bonding force with a plastic base material at high temperature to improve mechanical characteristics at room temperature and high temperature and wear and friction characteristics.

Example embodiments of the present disclosure provide an engineering plastic composite. The engineering plastic composite includes a carbon fiber having a surface modified by a hydrogen plasma and including a functional group and an engineering plastic. The carbon fiber is mixed with the engineering plastic to constitute a composite.

In example embodiments, the modified carbon fiber may include functional groups containing carbon (C) and hydrogen (H).

In example embodiments, the modified carbon fiber may be in the range from 20 to 30 percent by volume of the engineering plastic.

In example embodiments, the carbon fiber may be any one of a PAN-based carbon fiber, a PITCH-based carbon fiber, and a Rayon-based carbon fiber. A surface of the carbon fiber may be coated with polyurethane, and the polyurethane may be removed by a hydrogen plasma treatment.

In example embodiments, a tensile strength of the engineering plastic may be less than or equal to 239 MPa at room temperature. A tensile strength of the engineering plastic composite may be less than or equal to 150 MPa at temperature of 150 degrees Celsius.

In example embodiments, a coefficient of friction of the engineering plastic composite may be less than or equal to 0.12.

In example embodiments, a yield strength of the engineering plastic composite may be less than or equal to 149 MPa.

In example embodiments, a modulus of elasticity of the engineering plastic composite may be less than or equal to 25 GPa.

In example embodiments, a strength of the engineering plastic composite may be less than or equal to 35.7 MN/m.

In example embodiments, wear amount of the engineering plastic composite may be less than or equal to $1.17 \times 10^{-9}$ mm$^3$/N·m.

Example embodiments of the present disclosure provide a method for producing an engineering plastic composite. The method includes performing a plasma treatment using a reactive gas including a carbon fiber bundle to modify a surface of the carbon fiber bundle and attach a functional group and mixing the modified carbon fiber with an engineering plastic to constitute a composite.

In example embodiments, the reactive gas may be a hydrogen gas ($H_2$).

In example embodiments, a surface of the carbon fiber bundle may be coated with polyurethane, and the polyurethane may be removed by the plasma treatment.

In example embodiments, the plasma treatment may be performed in a plasma apparatus which is disposed inside a vacuum container and includes a top electrode and a bottom electrode disposed to face each other by a capacitively-coupled hydrogen plasma which is generated by RF power which places the carbon fiber bundle at the bottom electrode, heats the bottom electrode, and receives and provides a hydrogen gas to the top electrode.

In example embodiments, a process pressure of the vacuum container may be between 50 and 1000 milliTorr (mTorr), a reaction temperature of the bottom electrode may be between 300 and 700 degrees Celsius, and power applied to the top electrode may be between 100 and 1000 watts (W).

In example embodiments, the carbon fiber may be in the range from 20 to 30 percent by volume of the engineering plastic.

BRIEF DESCRIPTION OF THE DRAWINGS

The present disclosure will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the present disclosure.

DETAILED DESCRIPTION

Figure 1:
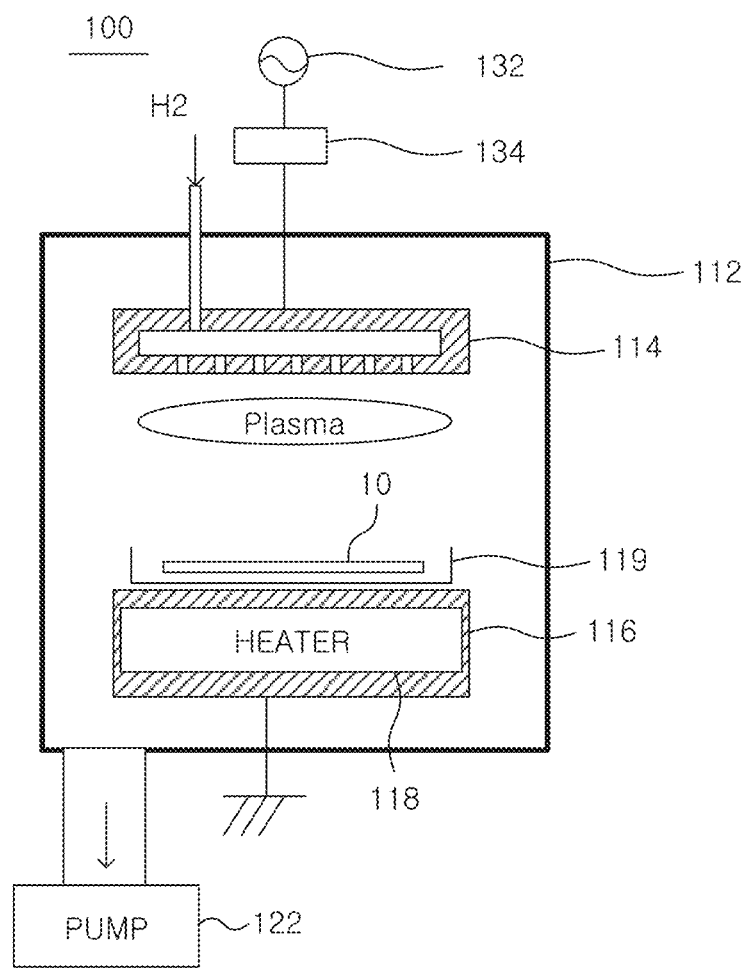
FIG. 1 is a conceptual diagram of a plasma apparatus for plasma-treating a carbon fiber according to an example embodiment of the present disclosure.

According to example embodiments of the present disclosure, a carbon fiber surface plasma treatment is performed to modify its surface, attach a chemical functional group, adjust a bonding structure of carbon, and adjust roughness. The modified carbon fiber is mixed with an engineering plastic to constitute a composite. The composite provides room-temperature and high-temperature mechanical characteristics and high wear and friction characteristics. The composite is an engineering plastic composite for high heat resistance, wear resistance, and low friction and includes a hydrogen plasma-treated carbon fiber as a high-temperature reinforcement.

According to example embodiments of the present disclosure, a hydrogen plasma treatment is performed to produce chemical functional groups such as C—C, C=C, —CH, C—H, and OH on a carbon fiber surface. The carbon fiber surface is modified by hydrogen plasma to transform carbon bonds, i.e., transform an SP$^2$ bond of graphite structure to an $SP^3$ bond of diamond structure. The carbon fiber may be any one of a PAN-based carbon fiber, a Pitch-based carbon fiber, and a Rayon-based carbon fiber.

Example embodiments will now be described more fully with reference to the accompanying drawings, in which some example embodiments are shown. Example embodiments may, however, be embodied in many different forms and should not be construed as being limited to the embodiments set forth herein; rather, these example embodiments are provided so that this disclosure will be thorough and complete, and will fully convey the scope of example embodiments of the present disclosure to those of ordinary skill in the art. In the drawings, the thicknesses of layers and regions are exaggerated for clarity. Like reference characters and/or numerals in the drawings denote like elements, and thus their description may be omitted.

FIG. 1 is a conceptual diagram of a plasma treatment apparatus 100 for plasma-treating a carbon fiber according to an example embodiment of the present disclosure.

Referring to FIG. 1, the plasma treatment apparatus 100 includes a vacuum chamber 112 and a top electrode 114 and a bottom electrode 116 provided inside the vacuum chamber 112 and disposed to face each other. The top electrode 114 is supplied with radio-frequency (RF) power from an RF power supply 132 through a matching network 134. The top electrode 114 may generate a capacitively-coupled plasma. The top electrode 114 may receive a reactive gas from an external entity and distribute and emit the gas. The reactive gas is a hydrogen gas. A frequency of the RF power may be 13.56 MHz, and the power supplied to the top electrode 114 may be several tens of watts (W) to several kilowatts (kW).

In a process of plasma-treating a commercially available carbon fiber bundle, besides a reactive gas, an inert gas such as argon may be added to adjust discharge characteristics of the gas or form a functional group.

The bottom electrode 116 may include a heater 118 therein and may be grounded. A ceramic crucible 119 is disposed on the bottom electrode 116. The crucible 119 stores a commercially available carbon fiber bundle 10. The crucible 119 is heated by the heater 118. A temperature of the heater 118 or the crucible 119 may be between 300 and 700 degrees Celsius. When the temperature of the crucible 119 is too high, a carbon fiber may be deposited by a contaminant. Preferably, the temperature of the crucible 119 may be between 300 and 400 degrees Celsius. The reactive gas is supplied after the temperature of the crucible 119 reaches a predetermined process temperature. When a pressure is stabilized, RF power is supplied to the top electrode 114 to generate a hydrogen plasma.

Preferable, the reaction temperature is 300 degrees Celsius. Since a sufficient reaction cannot be performed when the reaction temperature is less than 200 degrees Celsius, the reaction temperature is not preferable. When the reaction temperature is higher than 1000 degrees Celsius, a carbon fiber may be physically or chemically changed by the extremely high temperature. Hence, the reaction temperature higher than 1000 degrees Celsius is not preferable.

A plasma treatment time of the commercially available carbon fiber may be between several minutes and several hours. The commercially available carbon fiber has a length of 10 millimeters (mm) and a thickness of 5 micrometers (μm), and a surface of the commercially available carbon fiber is coated with polyurethane.

A process pressure of the vacuum chamber 112 may be in the range of 100 to 100 milliTorr (mTorr) and may be preferably 250 mTorr.

A hydrogen plasma treatment time of the carbon fiber may be between one and five hours. The hydrogen plasma causes a chemical reaction to activate (or etch) a substrate surface while modifying a carbon crystal structure and producing chemical functional groups on the surface.

A method for producing a carbon fiber reinforced engineering plastic composite according to an example embodiment of the present disclosure includes plasma-treating a carbon fiber bundle with a hydrogen-containing reactive gas to modify a surface of the carbon fiber bundle and attach a functional group and mixing the modified carbon fiber with an engineering plastic to constitute a composite.

The engineering plastic includes one or more high-functional engineering plastics selected from the group consisting of polyphenylene sulfide (PPS), polyether imide (PEI), polyether sulfone (PES), polyarylate (PAR), polyether ether ketone (PEEK), and tetrafluoroethylene resin (PTFE).

The carbon fiber content of the composite may be 20 to 30 percent by volume of the engineering plastic. When the carbon fiber content is out of the above range, mechanical characteristics including high-temperature strength and friction characteristics are deteriorated. Therefore, the carbon fiber content out of the above range is not preferable.

The carbon fiber reinforced engineering plastic composite may have any size and shape according to a plastic molding method.

Figure 2:
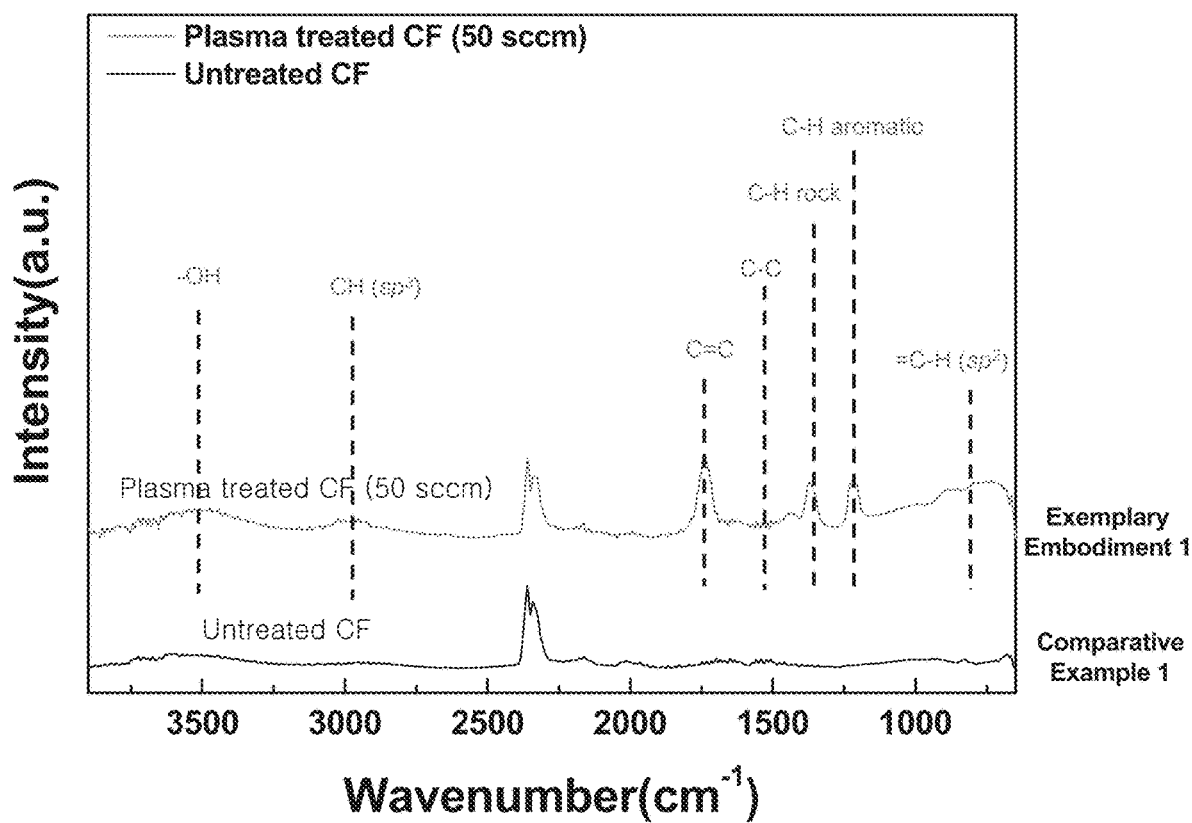
FIG. 2 shows an FT-IR result indicating an infrared absorption spectrum of a hydrogen plasma-treated carbon fiber according to an example embodiment of the present disclosure.

FIG. 2 shows an FT-IR result indicating an infrared absorption spectrum of a hydrogen plasma-treated carbon fiber according to an example embodiment of the present disclosure.

Referring to FIG. 2, the hydrogen plasma-treated carbon fiber employed a commercially available carbon fiber as a starting material. The commercially available carbon fiber has a surface coated with polyurethane and has a length of 10 mm and a thickness of 5 μm. The carbon fiber was treated for an hour in a plasma treatment apparatus 100 at RF power of 450 W, pressure of 250 mTorr, hydrogen flow rate of 100 standard cubic centimeters per minute (sccm), and reaction temperature of 300 degrees Celsius. Example 1 is an FT-IR analysis result of a plasma-treated sample, and it was confirmed that functional groups each including carbon (C) and hydrogen (H) were produced.

Example 1 is a result obtained by measuring a plasma-untreated commercially available carbon fiber.

Figure 3:
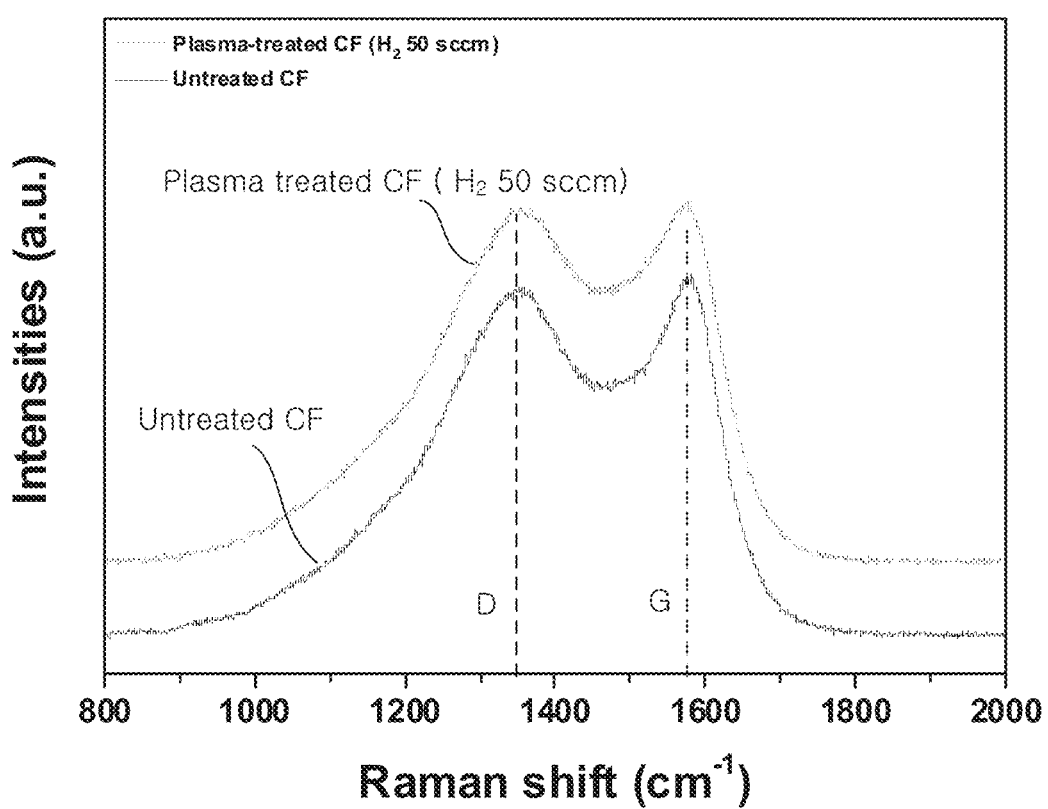
FIG. 3 shows a Raman spectroscopy result of a hydrogen plasma-treated carbon fiber according to an example embodiment of the present disclosure.

FIG. 3 shows a Raman spectroscopy result of a hydrogen plasma-treated carbon fiber according to an example embodiment of the present disclosure.

Referring to FIG. 3, Raman shift has a disordered peak (D peak) and a graphite peak (G peak). The D peak indicates an $SP^3$ bond degree, and the G peak indicates an $SP^2$ bond degree.

Figure 4:
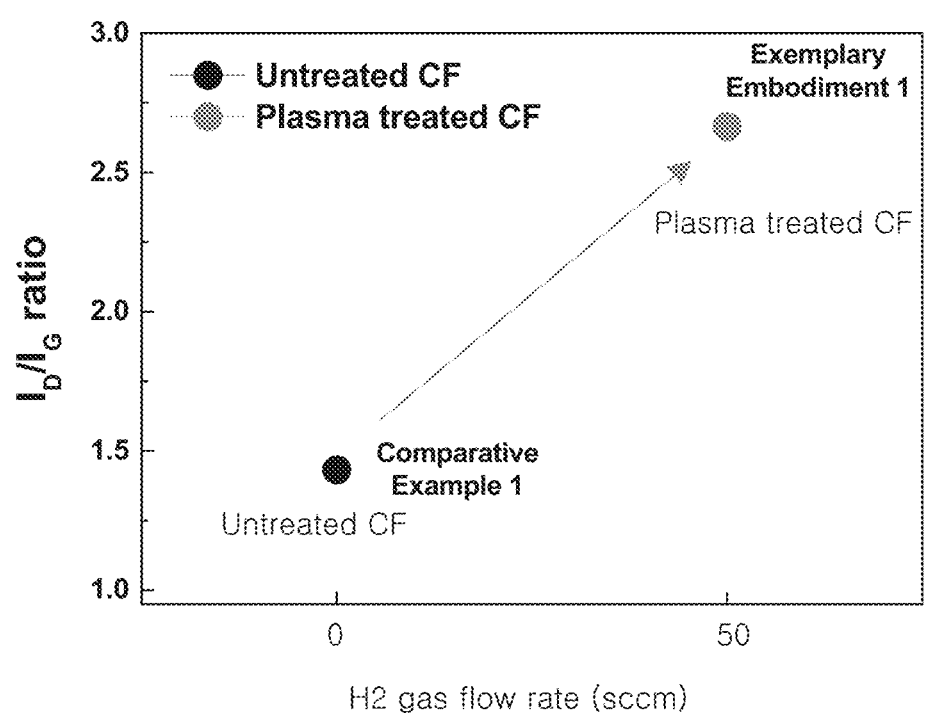
FIG. 4 shows a result indicating an integrated signal ratio of a D peak and a G peak of the Raman analysis result in FIG. 3.

FIG. 4 shows a result indicating an integrated signal ratio of a D peak and a G peak of the Raman analysis result in FIG. 3.

Referring to FIG. 4, a D peak integral signal $I_D$ is a result of integrating an area of a D peak and a G peak integral signal $I_G$ is a result of integrating an area of a G peak. A signal ratio ($I_D/I_G$) increases as a flow rate of hydrogen gas generating a plasma increases. Accordingly, the $SP^3$ bond degree is increased by a hydrogen plasma treatment of a carbon fiber to cause surface modification. Comparative Example 1 is a hydrogen plasma-untreated result, and Exemplary Embodiment 1 is a plasma-treated result with a hydrogen gas flow rate of 50 sccm.

Figure 5:
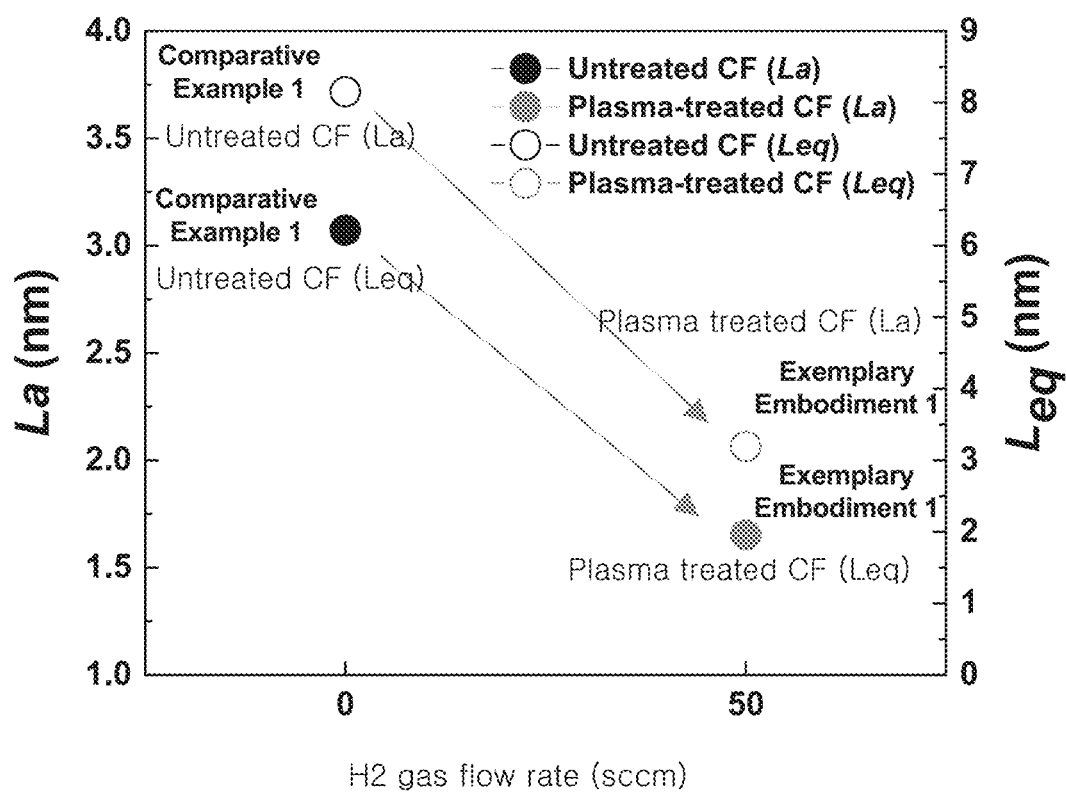
FIG. 5 is a graph showing an average graphene size (La) and an average crystal size (Leq) obtained by analyzing the Raman analysis result in FIG. 3.

FIG. 5 is a graph showing an average graphene size (La) and an average crystal size (Leq) obtained by analyzing the Raman analysis result in FIG. 3.

Referring to FIG. 5, both the average graphene size (La) and the average crystal size (Leq) degrease as a hydrogen plasma treatment is performed, which indicates that a surface of a carbon fiber is modified.

Figure 6A:
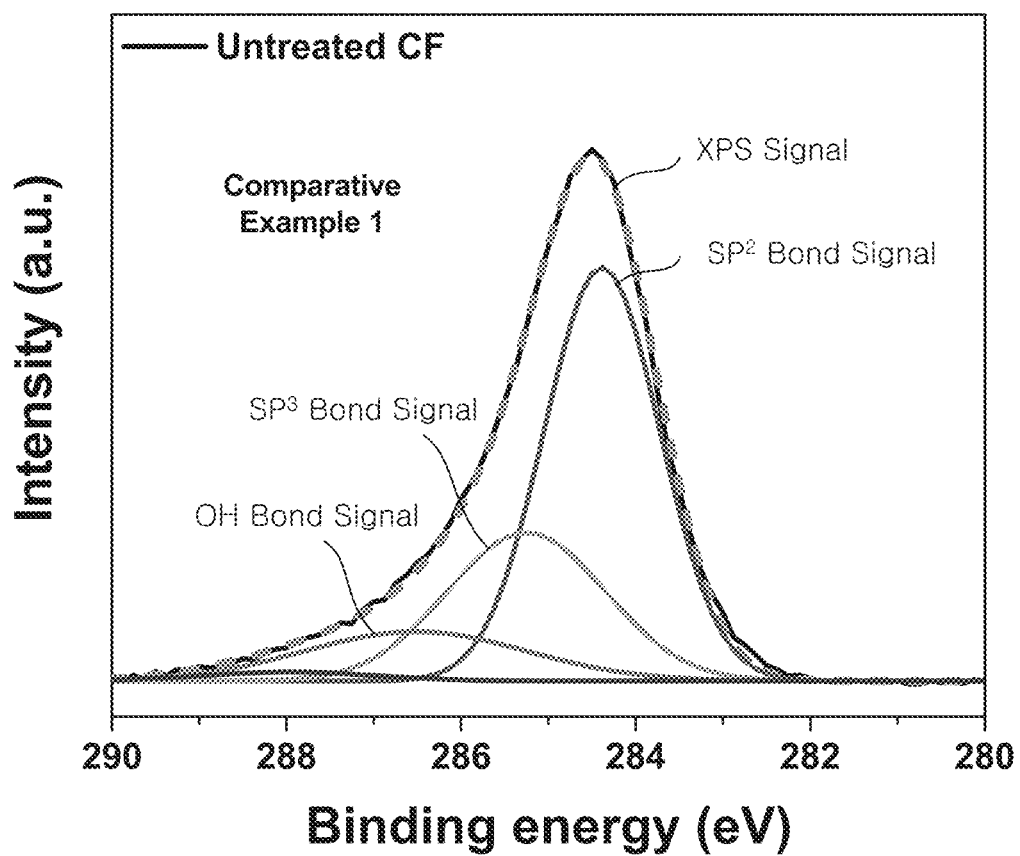
FIG. 6A shows an X-ray photoelectron spectroscopy (XPS) result of a hydrogen plasma-untreated carbon fiber.

FIG. 6A shows an X-ray photoelectron spectroscopy (XPS) result of a hydrogen plasma-untreated carbon fiber.

Referring to FIG. 6A, a red dotted line (or black) is a result of a hydrogen plasma-untreated carbon fiber. The XPS spectrum may be divided into bond components. Blue indicates $SP^2$ bond, pink indicates $SP^3$ bond, green indicates OH bond, and dark yellow indicates COOH bond.

Figure 6B:
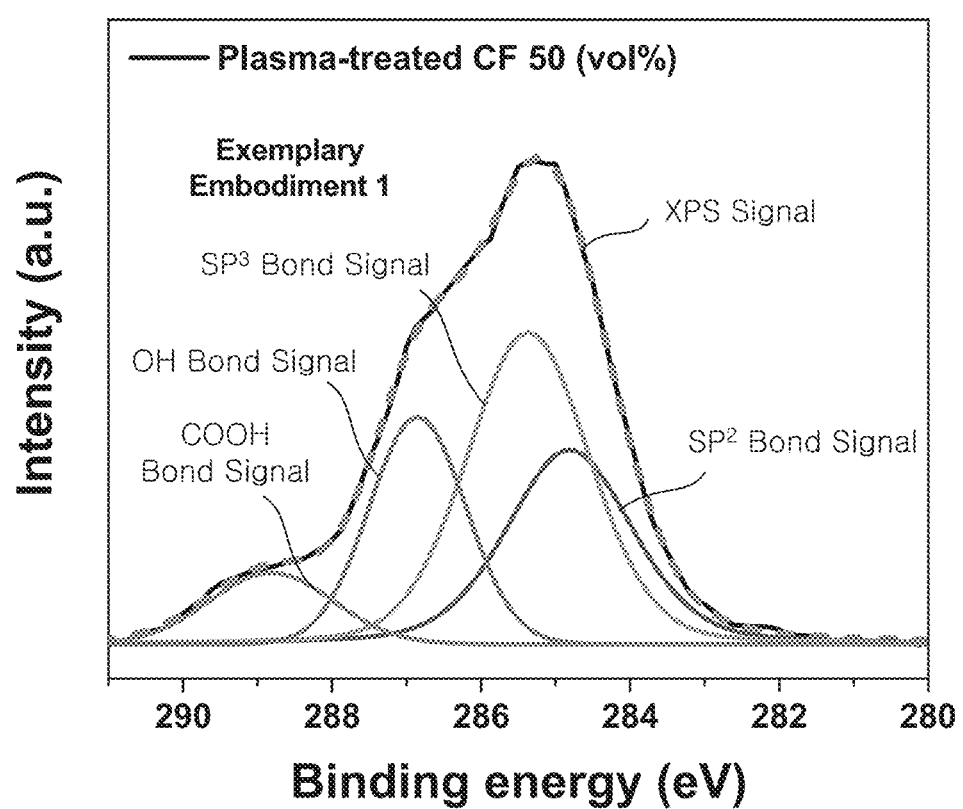
FIG. 6B shows an X-ray photoelectron spectroscopy (XPS) result of a hydrogen plasma-treated carbon fiber.

FIG. 6B shows an X-ray photoelectron spectroscopy (XPS) result of a hydrogen plasma-treated carbon fiber.

Referring to FIG. 6B, a red dotted line (or black) indicates a result of a plasma-untreated carbon fiber. The XPS spectrum may be divided into bond components. Blue indicates $SP^2$ bond, pink indicates $SP^3$ bond, green indicates OH bond, and dark yellow indicates COOH bond.

Figure 6C:
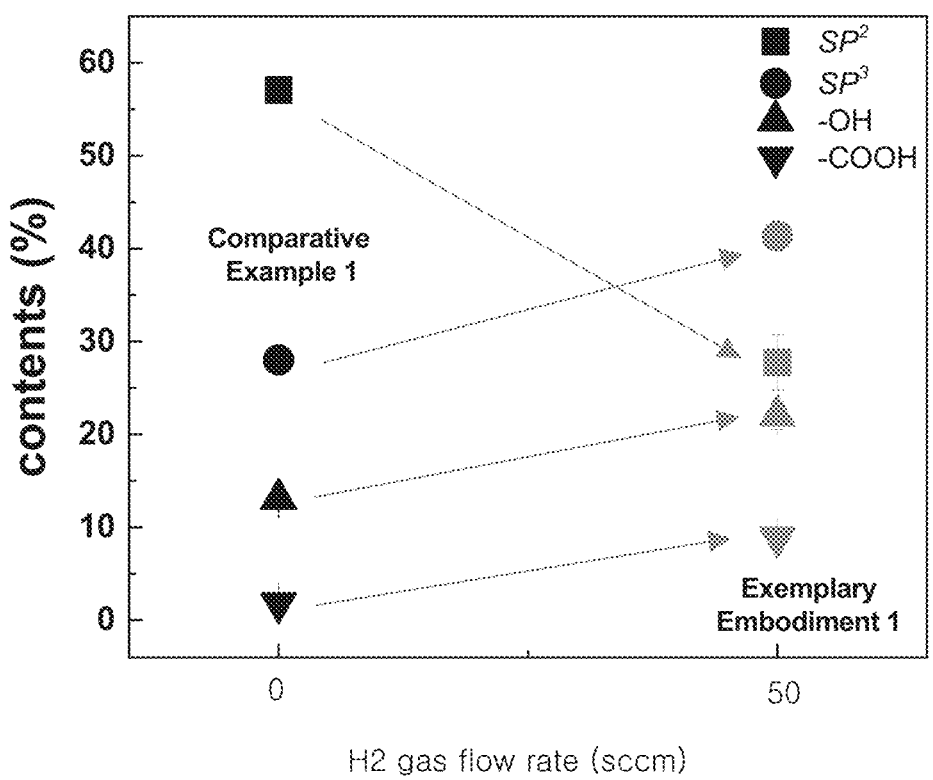
FIG. 6C shows X-ray photoelectron spectroscopy (XPS) result analysis of a hydrogen plasma-untreated carbon fiber and a hydrogen plasma-treated carbon fiber.

FIG. 6C shows X-ray photoelectron spectroscopy (XPS) result analysis of a hydrogen plasma-untreated carbon fiber and a hydrogen plasma-treated carbon fiber.

Referring to FIG. 6C, the $SP^2$ bond is decreased by a hydrogen plasma treatment and the $SP^3$ bond, the OH bond, and the COOH bond are increased by a plasma treatment. Thus, the carbon fiber is modified by the hydrogen plasma treatment and has a functional group.

Figure 7A:
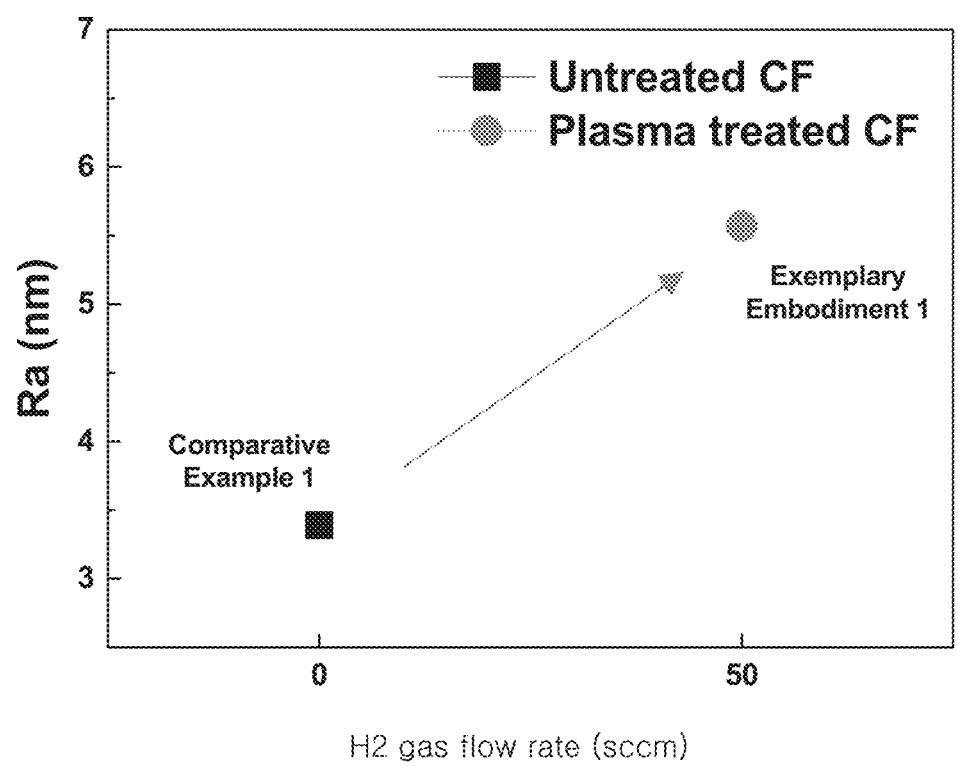
FIG. 7A shows a result obtained by measuring surface roughness before and after hydrogen plasma treatment.

FIG. 7A shows a result obtained by measuring surface roughness before and after hydrogen plasma treatment.

Referring to FIG. 7A, surface roughness Ra is increased by a hydrogen plasma treatment.

Figure 7B:
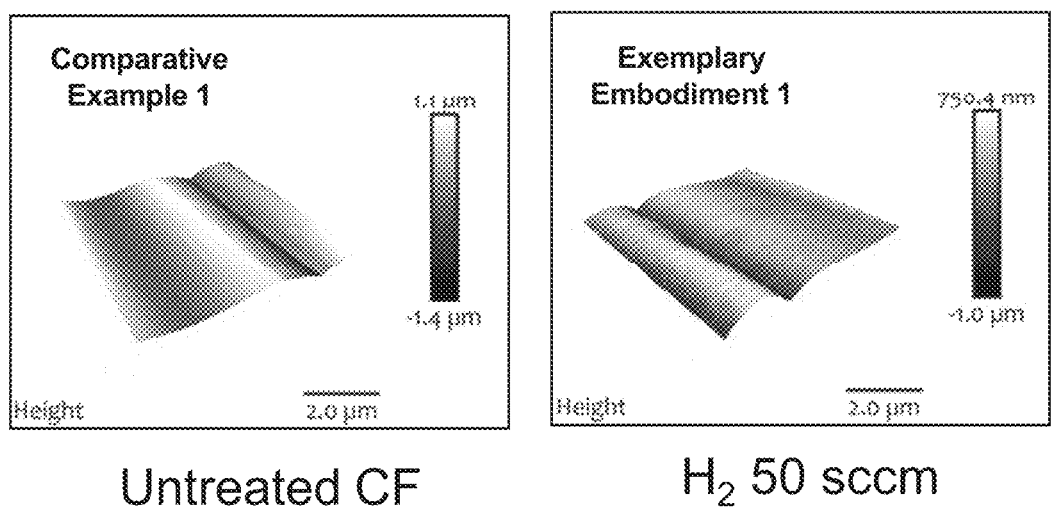
FIG. 7B is an atomic-force microscopy (AFM) image to check surface roughness before and after hydrogen plasma treatment.

FIG. 7B is an atomic-force microscopy (AFM) image to check surface roughness before and after hydrogen plasma treatment.

Figure 8A:
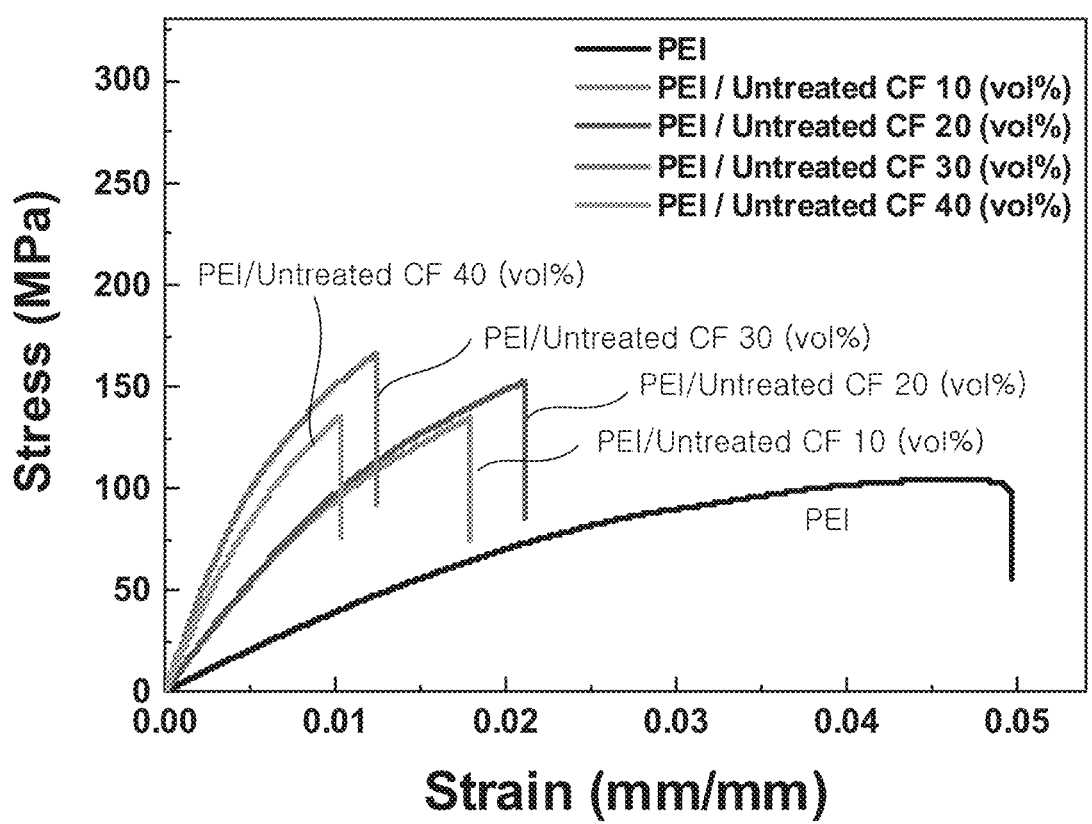
FIG. 8A is a graph of performing a tensile test of an engineering plastic composite including a plasma-untreated carbon fiber according to an example embodiment of the present disclosure.

Referring to FIG. 7B, surface roughness increases when a hydrogen plasma treatment is performed FIG. 8A is a graph of performing a tensile test of an engineering plastic composite including a plasma-untreated carbon fiber according to an example embodiment of the present disclosure.

Referring to FIG. 8A, a composite was produced by mixing a hydrogen plasma-untreated carbon fiber with a commercially available polyether imide (PEI) that is a high-strength engineering plastic. Samples were prepared, where a volume ratio of the carbon fiber increased to zero, 10, 20, 30, and 40 percent as compared to the volume of the high-strength engineering plastic, respectively.

Figure 8B:
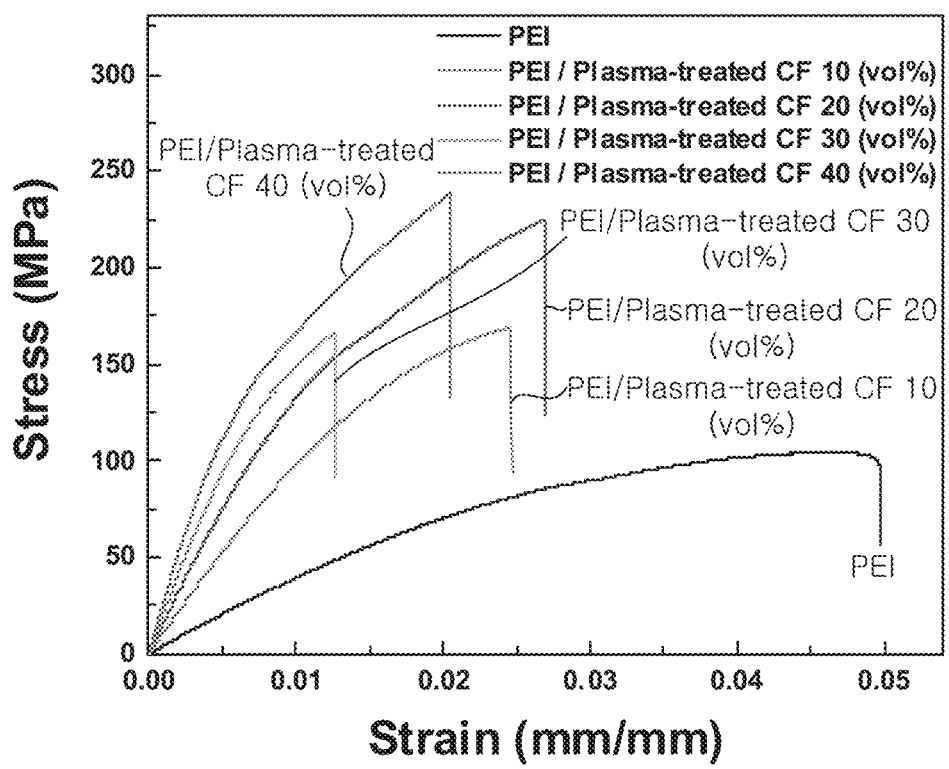
FIG. 8B is a graph of performing a tensile test of an engineering plastic composite including a plasma-treated carbon fiber according to an example embodiment of the present disclosure.

FIG. 8B is a graph of performing a tensile test of an engineering plastic composite including a plasma-treated carbon fiber according to an example embodiment of the present disclosure.

Referring to FIG. 8B, a composite was produced by mixing a hydrogen plasma-treated carbon fiber with a commercially available PEI that is a high-strength engineering plastic. Samples were prepared, where a volume ratio of the carbon fiber increased to zero, 10, 20, 30, and 40 percent, respectively. A composite including a PEI base material depending on a volume ratio was mixed by a kneader apparatus at temperature of 260 degrees Celsius for 30 minutes to complete a composite in which a carbon fiber is uniformly distributed. The obtained composite material was compressed/molded by applying a pressure of 35 MPa at temperature of 290 degrees Celsius using a compression/molding apparatus to prepare a sample having a thickness of 3.0 mm. In addition, a PEI sample was prepared in the same manner as described above and functions of the PEI sample were compared.

Figure 9:
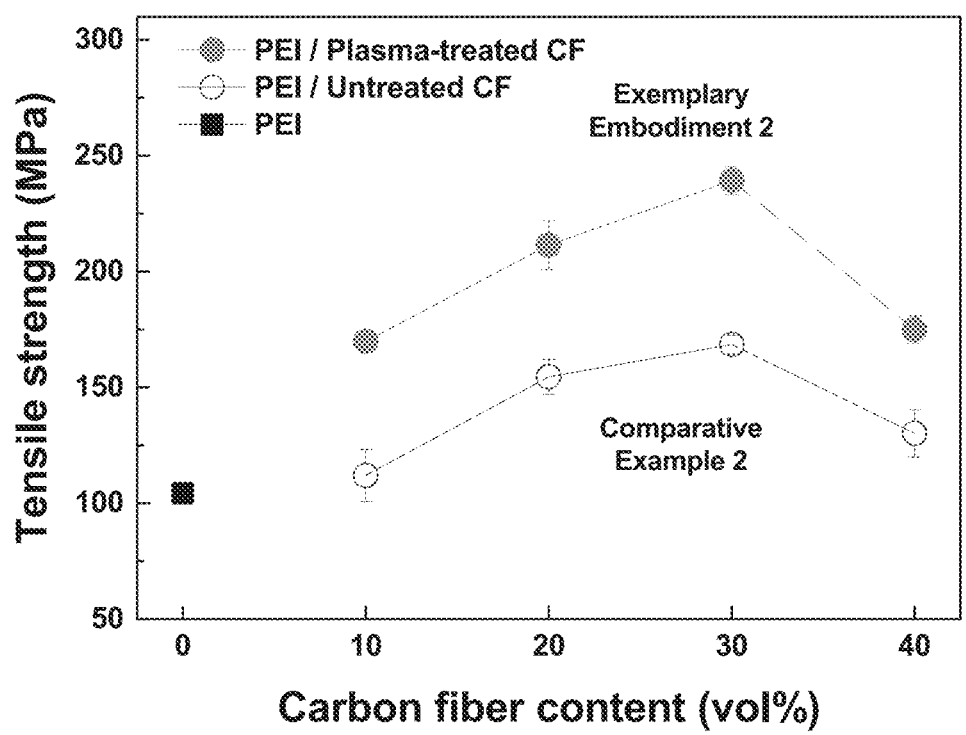
FIG. 9 shows a tensile strength depending on a carbon fiber volume ratio of a composite including a hydrogen plasma-treated carbon fiber and a hydrogen plasma-untreated carbon fiber.

FIG. 9 shows a tensile strength depending on a carbon fiber volume ratio of a composite including a hydrogen plasma-treated carbon fiber and a hydrogen plasma-untreated carbon fiber.

Referring to FIG. 9, a sample was prepared in the same manner as described in FIGS. 8A and 8B. A composite including a hydrogen plasma-treated carbon fiber exhibits a higher tensile strength than a composite including a hydrogen plasma-untreated carbon fiber. Accordingly, the composite including a hydrogen plasma-treated carbon fiber exhibits superior mechanical characteristics.

In the case of PEI to which a carbon fiber is not added at all, a tensile strength is 104 MPa. On the other hand, in the case of Comparative Example 2 in which a plasma-untreated carbon fiber is added, a tensile strength significantly increases to 170 MPa in a sample of a carbon fiber volume ratio of 30. A sample of Exemplary Embodiment 2 prepared from the plasma-treated carbon fiber exhibited a higher tensile strength of 239 MPa than the sample prepared from Comparative Example 2 at a carbon fiber volume ratio of 30.

Similarly, an elastic modulus, a yield strength, and stiffness exhibited the highest performance in a sample of a carbon fiber volume ratio of 30. The plasma-treated carbon fiber, i.e., Exemplary Embodiment 2 exhibited higher performance than Comparative Example 2. This is because an bonding force with a base material is improved in the composite by production of a chemical functional group on a carbon fiber surface for a plasma carbon fiber treatment, change in structure and size of the carbon fiber, and increase in roughness. In addition, Exemplary Embodiment 2 exhibited a higher room-temperature tensile strength than 173 MPa that is the tensile strength of a cast iron used as a commercially available metal material.

Figure 10:
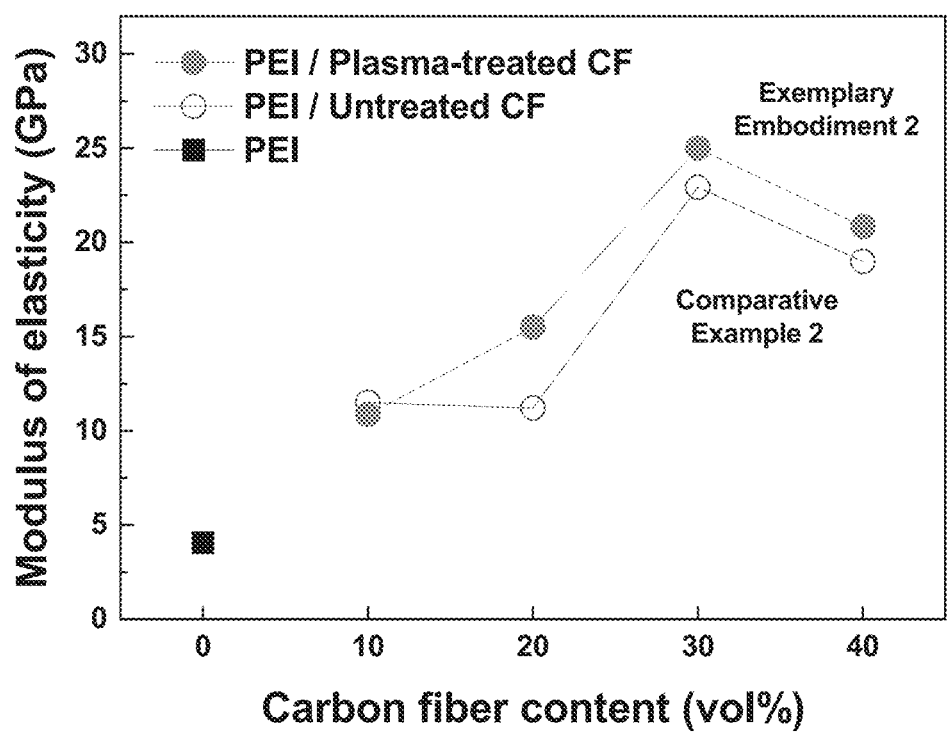
FIG. 10 shows a modulus of elasticity depending on a carbon fiber volume ratio of a composite including a plasma-treated carbon fiber and a plasma-untreated carbon fiber.

FIG. 10 shows a modulus of elasticity depending on a carbon fiber volume ratio of a composite including a plasma-treated carbon fiber and a plasma-untreated carbon fiber.

Referring to FIG. 10, a sample was prepared in the same manner as described in FIGS. 8A and 8B. A composite including a hydrogen plasma-treated carbon fiber exhibits a greater modulus of elasticity than a composite including a hydrogen plasma-untreated carbon fiber. Accordingly, the composite including a hydrogen plasma-treated carbon fiber exhibits superior mechanical characteristics. A modulus of elasticity of a composite including a hydrogen plasma-treated carbon fiber having a volume ratio of 30 percent is 25 GPa.

Figure 11:
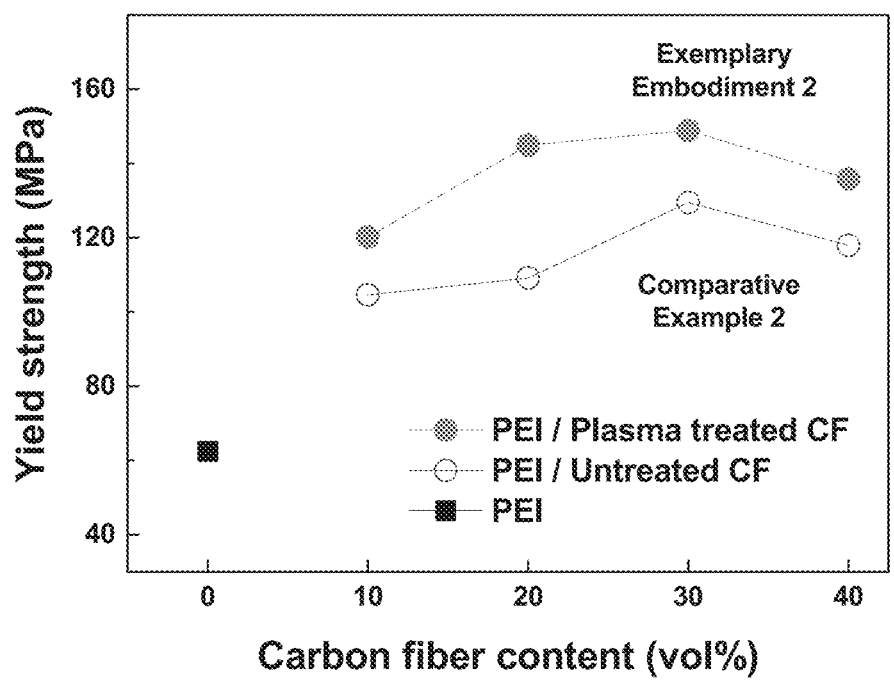
FIG. 11 shows a yield strength depending on a carbon fiber volume ratio of a composite including a plasma-treated carbon fiber and a plasma-untreated carbon fiber.

FIG. 11 shows a yield strength depending on a carbon fiber volume ratio of a composite including a plasma-treated carbon fiber and a plasma-untreated carbon fiber.

Referring to FIG. 11, a sample was prepared in the same manner as described in FIGS. 8A and 8B. A composite including a hydrogen plasma-treated carbon fiber exhibits a higher yield strength than a composite including a hydrogen plasma-untreated carbon fiber. Accordingly, the composite including a hydrogen plasma-treated carbon fiber exhibits superior mechanical characteristics. A yield strength of a composite including a hydrogen plasma-treated carbon fiber having a volume ratio of 30 percent is 149 MPa.

Figure 12:
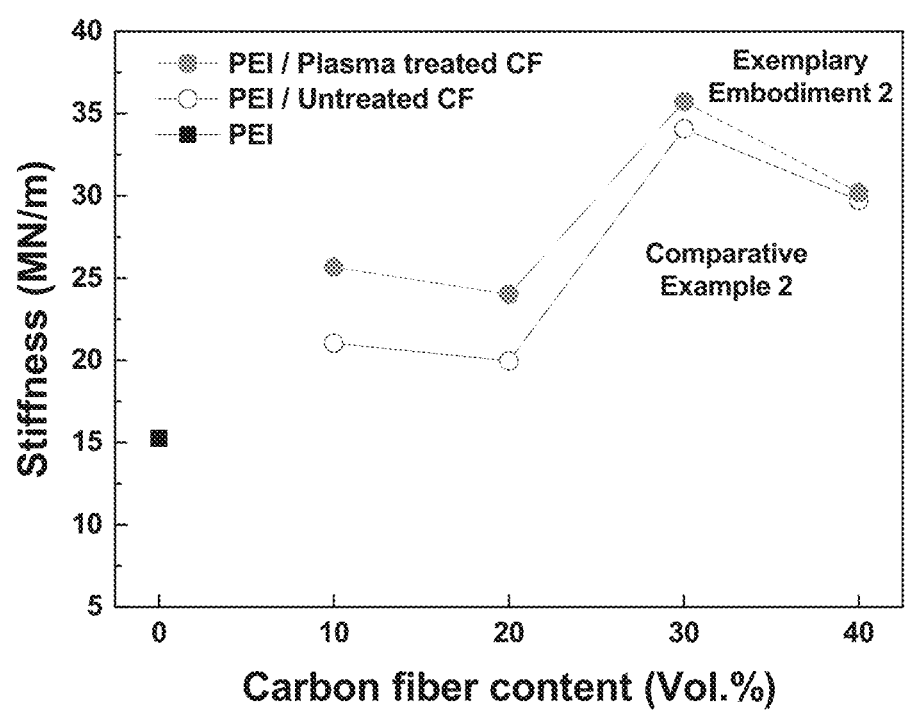
FIG. 12 shows a stiffness depending on a carbon fiber volume ratio of a composite including a plasma-treated carbon fiber and a plasma-untreated carbon fiber.

FIG. 12 shows a stiffness depending on a carbon fiber volume ratio of a composite including a plasma-treated carbon fiber and a plasma-untreated carbon fiber.

Referring to FIG. 12, a sample was prepared in the same manner as described in FIGS. 8A and 8B. A composite including a hydrogen plasma-treated carbon fiber exhibits a higher stiffness than a composite including a hydrogen plasma-untreated carbon fiber. Accordingly, the composite including a hydrogen plasma-treated carbon fiber exhibits superior mechanical characteristics. A stiffness of a composite including a hydrogen plasma-treated carbon fiber having a volume ratio of 30 percent is 35.7 MN/m.

Figure 13:
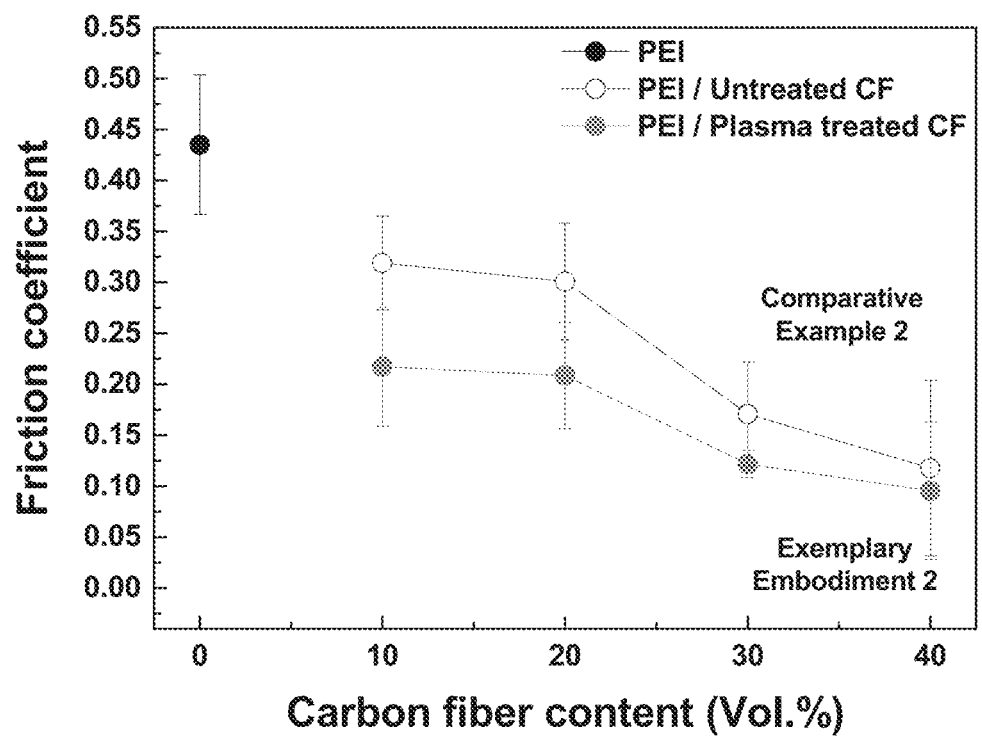
FIG. 13 shows a friction coefficient depending on a carbon fiber volume ratio of a composite including a plasma-treated carbon fiber and a plasma-untreated carbon fiber.

FIG. 13 shows a friction coefficient depending on a carbon fiber volume ratio of a composite including a plasma-treated carbon fiber and a plasma-untreated carbon fiber.

Referring to FIG. 13, a sample was prepared in the same manner as described in FIGS. 8A and 8B. A composite including a hydrogen plasma-treated carbon fiber exhibits a lower friction coefficient than a composite including a hydrogen plasma-untreated carbon fiber. Accordingly, the composite including a hydrogen plasma-treated carbon fiber exhibits superior mechanical characteristics. A friction coefficient of a composite including a hydrogen plasma-treated carbon fiber having a volume ratio of 30 percent is 0.12.

The lower a friction coefficient, the more preferable. It will be appreciated that a friction coefficient has a superior value when a friction coefficient of Exemplary Embodiment 2 of an engineering plastic with a plasma-treated carbon fiber of 40 volume ratio added therein is 0.12 and 0.43 in the case of PEI than when a friction coefficient of Comparative Example 2 of PEI with a carbon fiber of 40 volume ratio added therein. This refers to the fact that as wear resistance is improved by increased strength resulting from base reinforcement in an engineering plastic, a contact area between a material and a counterpart material is reduced and thus a contact resistance is lowered to reduce a friction coefficient.

Figure 14:
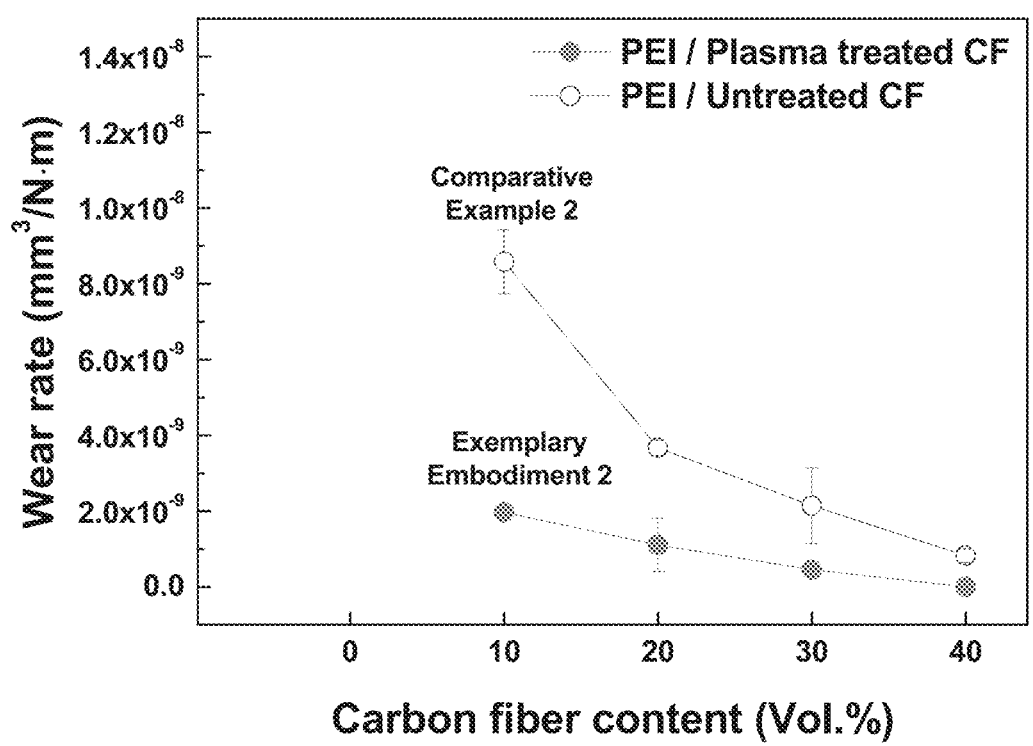
FIG. 14 shows a wear rate depending on a carbon fiber volume ratio of a composite including a plasma-treated carbon fiber and a plasma-untreated carbon fiber.

FIG. 14 shows a wear rate depending on a carbon fiber volume ratio of a composite including a plasma-treated carbon fiber and a plasma-untreated carbon fiber.

Referring to FIG. 14, a sample was prepared in the same manner as described in FIGS. 8A and 8B. A composite including a hydrogen plasma-treated carbon fiber exhibits a lower wear rate than a composite including a hydrogen plasma-untreated carbon fiber. Accordingly, the composite including a hydrogen plasma-treated carbon fiber exhibits superior wear characteristics.

Comparative Example 2 is a PEI composite to which the plasma-untreated carbon fiber is added. Exemplary Embodiment 2 is a PEI composite to which the plasma-treated carbon fiber is added. It will be appreciated that a wear rate is $1.17 \times 10^{-9}$ mm$^3$/N·m in the case of PEI to which a plasma-treated carbon fiber of 40 volume ratio is added, which is significantly lower than $2.14 \times 10^{-9}$ mm$^3$/N·m that is a wear rate in the case of a sample to which a typical carbon fiber of 40 volume ratio is added. As described above, a friction coefficient is lowered by the effect resulting from base reinforcement caused by chemical bonding to an engineering plastic when a carbon fiber is plasma-treated.

Exemplary Embodiment 2 (the composite to which a plasma-treated carbon fiber is added) exhibited better room-temperature and high-temperature tensile strength, yield strength, modulus of elasticity, stiffness, coefficient of friction, and wear amount than Comparative Example 2 (the engineering plastic to which an untreated carbon fiber is added).

Figure 15:
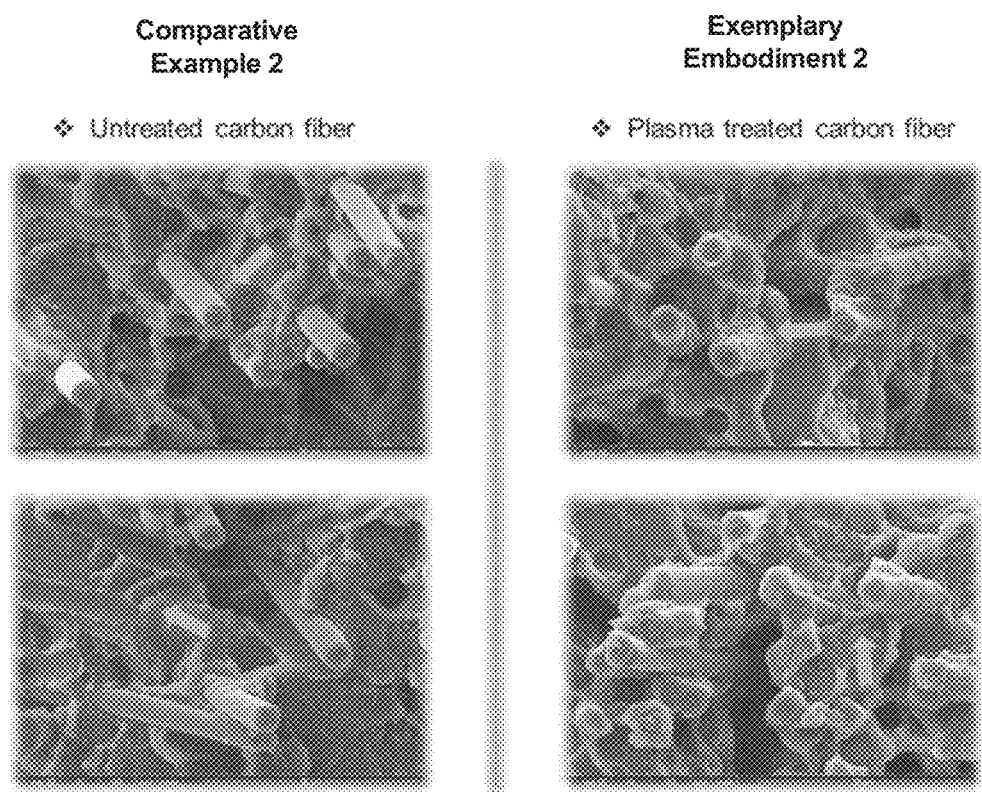
FIG. 15 shows a scanning electron microscope (SEM) image of a composite including a plasma-treated carbon fiber and a composite including a plasma-untreated carbon fiber.

FIG. 15 shows a scanning electron microscope (SEM) image of a composite including a plasma-treated carbon fiber and a composite including a plasma-untreated carbon fiber.

Referring to FIG. 15, a sample was prepared in the same manner as described in FIGS. 8A and 8B. A composite including a hydrogen plasma-treated carbon fiber exhibits a bonding force with polyether imide (PE), which is a base material, as compared to a composite including a hydrogen plasma-untreated carbon fiber. It is confirmed that more PEIs, each being a base material, bond to a carbon fiber surface in the composite produced from Exemplary Embodiment 2 than to a carbon fiber surface in the composite produced from Comparative Example 2. This is because a chemical functional group and a carbon crystal structure are transformed on a carbon fiber surface by a plasma treatment to improve the bonding force with the base material in the composite.

Figure 16:
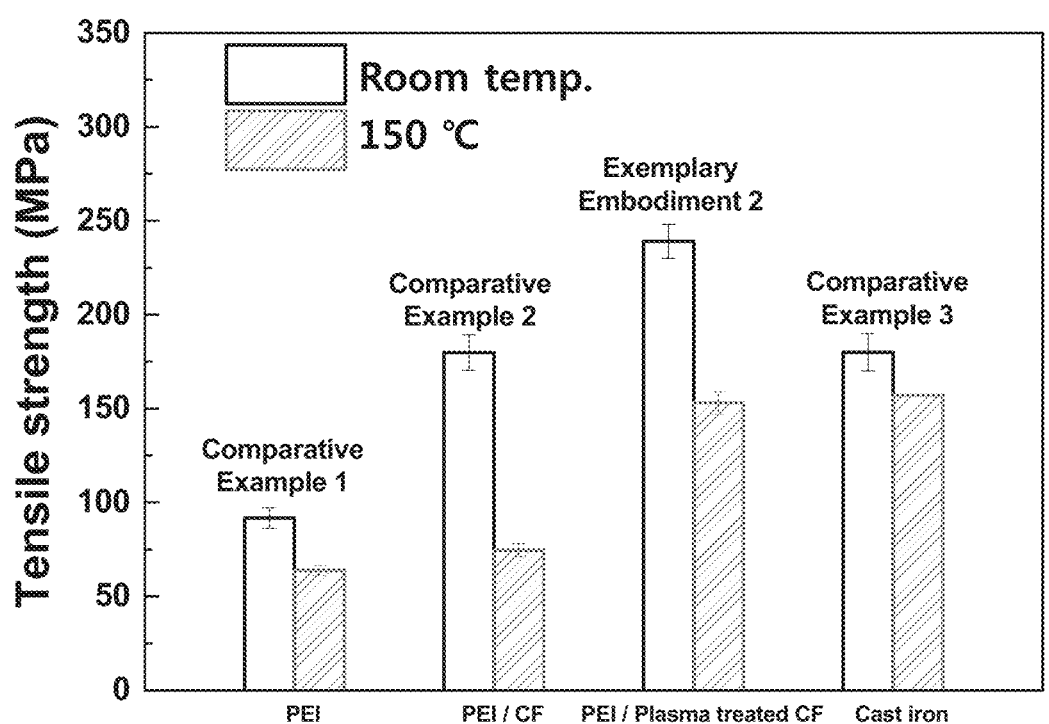
FIG. 16 is a graph showing tensile strengths depending on a measured temperature and a component and a measured temperature of a composite.

FIG. 16 is a graph showing tensile strengths depending on a measured temperature and a component and a measured temperature of a composite.

Referring to FIG. 16, Comparative Example 1 includes only PEI and Comparatively Example 2 is a composite in which a plasma-untreated carbon fiber having a volume ratio of 30 percent is mixed with PEI. Comparative Example 3 is cast iron which is a metal. Exemplary Embodiment 2 is a composite in which a plasma-treated carbon fiber having a volume ratio of 30 percent is mixed with PEI.

A tensile strength was measured at room temperature and temperature of 150 degrees Celsius by using samples. As compared to the tensile strength at the temperature of 150 degrees Celsius, a high-temperature tensile strength of PEI and a tensile strength of Comparative Example 2 to which a plasma-untreated carbon fiber is added exhibit a high-temperature tensile strength of 60 MPa which is nearly similar thereto. Accordingly, performance of a conventional carbon fiber reinforced engineering plastic composite is significantly deteriorated at the high temperature of 150 degrees Celsius.

However, in the sample of Exemplary Embodiment 2, a high-temperature tensile strength rapidly increases due to the plasma treatment effect of a carbon fiber. A value of 150 MPa is similar to a value of Comparative Example 3. Thus, a composite according to an example embodiment of the present disclosure exhibits a higher tensile strength at room temperature than a metal material and also exhibits a similar tensile strength even at high temperature of 150 degrees Celsius to the metal material. As a result, the composite according to an example embodiment of the present disclosure may replace the metal material.

As described above, when a carbon fiber is treated with a plasma, a chemical functional group and a carbon bond structure are adjusted on a surface of the carbon fiber. Thus, the surface-modified carbon fiber may improve a bonding force with a plastic base material and friction characteristics at room temperature and high temperature. As a result, a carbon fiber reinforced polymer composite may provide high-strength, wear-resistance, and low-friction characteristics.

A high-strength engineering plastic including a carbon fiber has higher thermal characteristics than a conventional general-purpose plastic. However, when the high-strength engineering plastic including a carbon fiber is actually used in a mechanical component material for high temperature, it is severely damaged or worn. When a plasma-treated carbon fiber according to example embodiments of the present disclosure is used, a bonding force with a base material is promoted in an engineering plastic due to a functional group prepared on a surface of the carbon fiber to improve a high-temperature strength and friction characteristics.

Accordingly, a heat-resistance engineering plastic composite produced from the present disclosure may be used as a coating material of a component surface that requires heat-resistance characteristics. Especially, the heat-resistance engineering plastic composite may be suitably used as a material that replaces a mechanical metal material such as an automobile component, a high-temperature turbine or the like.

Although the present disclosure and its advantages have been described in detail, it should be understood that various changes, substitutions and alterations can be made herein without departing from the spirit and scope of the disclosure as defined by the following claims.

What is claimed is:

1. A method for producing an engineering plastic composite, comprising:
performing a plasma treatment using a reactive gas including a carbon fiber bundle to modify a surface of the carbon fiber bundle and attach a functional group; and
mixing the modified carbon fiber with an engineering plastic to constitute a composite,
wherein the plasma treatment is performed in a plasma apparatus which is disposed inside a vacuum container and includes a top electrode and a bottom electrode disposed to face each other by a capacitively-coupled hydrogen plasma which is generated by RF power which places the carbon fiber bundle at the bottom electrode, heats the bottom electrode, and receives and provides a hydrogen gas to the top electrode,
wherein a reaction temperature of the bottom electrode is between 300 and 400 degrees Celsius, and
wherein the surface of the carbon fiber bundle is modified by the plasma treatment to transform an $SP^2$ bond of graphite structure to an $SP^3$ bond of diamond structure.

2. The method as set forth in claim 1, wherein:
the reactive gas is a hydrogen gas ($H_2$).

3. The method as set forth in claim 1, wherein:
a surface of the carbon fiber bundle is coated with polyurethane, and
the polyurethane is removed by the plasma treatment.

4. The method as set forth in claim 1, wherein:
a process pressure of the vacuum container is between 50 and 1000 milliTorr (mTorr), and power applied to the top electrode is between 100 and 1000 watts (W).

5. The method as set forth in claim 1, wherein:
the carbon fiber is in the range from 20 to 30 percent by volume of the engineering plastic.

* * * * *